US011681304B2

(12) United States Patent
Kunwar et al.

(10) Patent No.: US 11,681,304 B2
(45) Date of Patent: Jun. 20, 2023

(54) EMERGENCY RESPONSE SYSTEM

(71) Applicant: International Business Machines Corporation, Armonk, NY (US)

(72) Inventors: Anup Raj Kunwar, Pflugerville, TX (US); Matthew Francis Rutkowski, Pflugerville, TX (US); James Edwards, Austin, TX (US); KwangYoung Oh, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 17/008,785

(22) Filed: Sep. 1, 2020

(65) Prior Publication Data

US 2022/0066478 A1 Mar. 3, 2022

(51) Int. Cl.

| | |
|---|---|
| *G05D 1/10* | (2006.01) |
| *G05D 1/00* | (2006.01) |
| *G05D 1/12* | (2006.01) |
| *B64C 39/02* | (2023.01) |
| *G05D 1/02* | (2020.01) |
| *B64U 101/00* | (2023.01) |

(52) U.S. Cl.
CPC ......... *G05D 1/1062* (2019.05); *B64C 39/024* (2013.01); *G05D 1/0088* (2013.01); *G05D 1/0214* (2013.01); *G05D 1/12* (2013.01); *B64U 2101/00* (2023.01)

(58) Field of Classification Search
None
See application file for complete search history.

(56) References Cited

U.S. PATENT DOCUMENTS

| | | | |
|---|---|---|---|
| 9,170,117 B1 * | 10/2015 | Abuelsaad | ............ B64C 39/024 |
| 9,307,383 B1 | 4/2016 | Patrick | |
| 9,915,945 B2 | 3/2018 | Fox et al. | |
| 10,216,181 B2 | 2/2019 | Fox et al. | |
| 10,233,021 B1 * | 3/2019 | Brady | .................. G06Q 10/047 |

(Continued)

FOREIGN PATENT DOCUMENTS

| | | |
|---|---|---|
| CN | 202649471 U | 1/2013 |
| CN | 106103275 A | 11/2016 |
| EP | 3183826 B1 | 6/2019 |

OTHER PUBLICATIONS

Atherton, "Google Patented a Drone Rescue Service," Popular Science, Apr. 6, 2016, 6 pages https://www.popsci.com/google-patented-drone-rescue-service/.

(Continued)

*Primary Examiner* — Jelani A Smith
*Assistant Examiner* — Davin Seol
(74) *Attorney, Agent, or Firm* — Grant Johnson (57) ABSTRACT

A controller for an emergency response system, a computer program product for an emergency response system, and a method for facilitating rescue One embodiment may comprise a processor coupled to a memory, the memory containing program instructions. The program instructions, when executed on the processor, may cause the controller to collect waypoint data during a user's activity, detect a first trigger event indicating that the user needs assistance, determine a first response plan for an autonomous vehicle (AV) for the first trigger event based on the collected waypoint data, and execute the first response plan.

16 Claims, 6 Drawing Sheets

(56) References Cited

U.S. PATENT DOCUMENTS

| | | | |
|---|---|---|---|
| 10,251,331 B2 | 4/2019 | Gordon et al. | |
| 2010/0088023 A1* | 4/2010 | Werner | G09B 5/02 455/566 |
| 2016/0050012 A1 | 2/2016 | Frolov et al. | |
| 2017/0088261 A1 | 3/2017 | Sequeira et al. | |
| 2017/0115667 A1* | 4/2017 | Marr | G08G 5/0034 |
| 2017/0253250 A1* | 9/2017 | Gordon | G06Q 50/00 |
| 2017/0314926 A1* | 11/2017 | Royster | G01C 5/005 |
| 2018/0107205 A1* | 4/2018 | Fox | G01S 19/17 |
| 2018/0204469 A1* | 7/2018 | Moster | G05D 1/0094 |
| 2018/0245927 A1 | 8/2018 | Frish et al. | |
| 2019/0139422 A1 | 5/2019 | Cheah et al. | |
| 2019/0196467 A1* | 6/2019 | Aldana Lopez | G08G 5/045 |
| 2020/0372813 A1* | 11/2020 | Smith | G08G 5/0039 |
| 2021/0141389 A1* | 5/2021 | Jonak | G01S 17/931 |
| 2021/0278834 A1* | 9/2021 | Kendoul | G05D 1/0022 |
| 2021/0407303 A1* | 12/2021 | Yogesha | G05D 1/1062 |
| 2022/0107640 A1* | 4/2022 | Groden | B64C 39/024 |

OTHER PUBLICATIONS

Schibanoff, "Follow the Patents: Latest Drone Technologies Give an Eagle Eye's View of the Future," PowerGrid International, Apr. 24, 2018, 14 pages, https://www.power-grid.com/2018/04/24/follow-the-patents-latest-drone-technologies-give-an-eagle-eye-s-view-of-the-future/.

"Lifeguard drone," QQQ, First comprehensive UAV system for water/public safety, and for emergency, Printed Aug. 3, 2020, 3 pages, https://www.f6s.com/lifeguarddrone.

Kessler, "Drone helps rescuers retrieve hiker stranded on a ledge in Snow Canyon," St. George News, Jan. 11, 2019, 8 pages, https://www.stgeorgeutah.com/news/archive/2019/01/11/mgk-drone-helps-rescuers-retrieve-hiker-stranded-on-a-ledge#.XXs8ei2ZPy9.

Ashley, "One of These Drones Could Save Your Life," MACH, Jan. 12, 2017, 12 pages https://www.nbcnews.com/mach/innovation/one-these-drones-just-might-save-your-life-n706206.

Real World Survivor, "Police Drone Saves Window Washer's Life in Abu Dhabi," Nov. 6, 2014, 4 pages, https://www.realworldsurvivor.com/2014/11/06/police-drone-saves-window-washers-life-abu-dhabi/.

Real World Survivor, "An Ambulance Drone Could Save Your Life," Nov. 5, 2014, 4 pages, https://www.realworldsurvivor.com/2014/11/05/ambulance-drone-save-life/.

Real World Survivor, "The DALER Robot: A Bat-Like Design For Air And Land Exploration," Feb. 3, 2015, 4 pages, https://www.realworldsurvivor.com/2015/02/03/daler-robot-bat-like-design-air-land-exploration/.

McFadden, "16 Common Ways Drones Are Being Used in Everyday Life," Interesting Engineering, Apr. 5, 2017, 20 pages, https://interestingengineering.com/15-common-ways-drones-are-being-used-in-everyday-life.

McNabb, "DRONEII: Drones and AI, All the Terms You Need to Know," Drone Life, Aug. 29, 2018, 4 pages, https://dronelife.com/2018/08/29/droneii-drones-and-ai-all-the-terms-you-need-to-know/.

"Drones and Artificial Intelligence," Drone Industry Insights, Aug. 2018, 1 page, https://dronelife.com/wp-content/uploads/2018/08/Drones-and-AI.png.

Phillips, "MMC's Tethered-Drone System Provides Telecommunications Solution in Extreme Conditions," Drone Life, Jun. 19, 2017, 2 pages, https://dronelife.com/2017/06/19/mmcs-tethered-drone-system-provides-telecommunications-solution-extreme-conditions/.

Schroth, "Seven Ways to Use Drone Mapping on the Farm This Season," Drone Life, Jan. 31, 2017, 7 pages, https://dronelife.com/2017/01/31/seven-ways-use-drone-mapping-farm-season/.

"Advantages And Disadvantages Of Drone Uses For Preppers," Survival Life, Printed Aug. 3, 2020, 18 pages, https://survivallife.com/drone-uses/.

Arnold, "A drone could potentially save your life in a mass casualty situation, thanks to a Maryland-based company," WUSA9, May 16, 2019, 9 pages, https://www.wusa9.com/article/news/local/maryland/a-drone-could-potentially-save-your-life-in-a-mass-casualty-situation-thanks-to-a-maryland-based-company/65-7ecae690-813d-4afb-b513-89f41fbbe593.

Read, "Life-saving drones," Royal Aeronautical Society, Mar. 21, 2017, 21 pages, https://www.aerosociety.com/news/life-saving-drones/.

"Drone saves two Australian swimmers in world first," BBC News Services, Jan. 18, 2018, 14 pages, https://www.bbc.com/news/world-australia-42731112.

"How to program a flight path?" Phantom Pilots, Jun. 28, 2016, 2 pages, https://phantompilots.com/threads/how-to-program-a-flight-path.82677/.

"Flight Controller," Onboard SDK, DJI Developer, Sep. 12, 2019, 6 pages, https://developer.dji.com/onboard-sdk/documentation/guides/component-guide-flight-control.html.

"Missions," Mobile SDK, DJI Developer, Jun. 27, 2017, 3 pages, https://developer.dji.com/mobile-sdk/documentation/introduction/component-guide-missions.html.

"GPS Missions sample," Onboard SDK, DJI Developer, Apr. 3, 2019, 2 pages, https://developer.dji.com/onboard-sdk/documentation/sample-doc/missions.html.

"SOS Drone / Safety drone," iF World Eesign Guide, Printed Aug. 3, 2020, 5 pages, https://ifworlddesignguide.com/entry/245590-sos-drone.

Diamandis, "AI and Robotics Are Transforming Disaster Relief," SingularityHub, Apr. 12, 2019, 11 pages, https://singularityhub.com/2019/04/12/ai-and-robotics-are-transforming-disaster-relief/.

"HELPER-Self Rescue Drones / Drones improvement," iF World Design Guide, Printed Aug. 3, 2020, 4 pages, https://ifworlddesignguide.com/entry/242216-helper-self-rescue-drones.

* cited by examiner

EMERGENCY RESPONSE SYSTEM

BACKGROUND

The present disclosure relates generally to the field of emergency response systems, and more particularly to an autonomous device-based emergency response system for remote areas.

While much of the world is served by modern telecommunications systems, some people will always want or need to travel through locales where it remains impossible to transmit an emergency distress signal or otherwise facilitate rescue. Common activities that may lead to such a situation include, without limitation, backcountry hiking and camping, heliskiing, off-the-grid cabins, blue water boating, underwater (SCUBA), and cave exploration.

SUMMARY

According to one or more embodiments, a controller for an emergency response system. One embodiment may comprise a processor coupled to a memory, the memory containing program instructions. The program instructions, when executed on the processor, may cause the controller to collect waypoint data during a user's activity, detect a first trigger event indicating that the user needs assistance, determine a first response plan for an autonomous vehicle (AV) for the first trigger event based on the collected waypoint data, and execute the first response plan.

According to one or more embodiments, a computer program product for an emergency response system, the computer program product comprising one or more computer readable storage media, and program instructions collectively stored on the one or more computer readable storage media. The program instructions may comprise program instructions for collecting waypoint data during a user's activity, program instructions for detecting a first trigger event indicating that the user needs assistance, program instructions for determining a first response plan for an autonomous vehicle (AV) for the first trigger event based on the collected waypoint data, and program instructions for executing the first response plan.

According to one or more embodiments, a method for facilitating rescue. One embodiment may comprise receiving a user profile of a user, receiving an activity profile from the user, the activity profile including an activity location for an activity, receiving location data for the activity location, automatically customizing a plurality of response plans for an autonomous vehicle (AV) based at least in part on the user profile, the activity profile, and the location profile, and configuring the AV. The AV may be configured to automatically follow the user during the activity, automatically collect waypoint data and waypoint annotations during the activity, wherein the waypoint annotations are collected by a plurality of devices available to the user during the activity, automatically update at least one of the plurality of response plans based on the collected waypoint data and the waypoint annotations, automatically detect a first trigger event during the activity, the first trigger event indicating that the user needs assistance, automatically select a first response plan from the plurality of response plans in response to the first trigger event based on the collected waypoint data and the waypoint annotations, automatically detect a second trigger during the activity, wherein the second trigger comprises detecting a potential rescuer nearby the AV, automatically select a second response plan from the plurality of response plans in response to the second trigger based on the collected waypoint data and the waypoint annotations, automatically detect a third trigger during the activity, wherein the third trigger comprises a low battery alert; automatically select a third response plan from the plurality of response plans in response to the third trigger based on the collected waypoint data and the waypoint annotations, automatically select a priority plan from among the first response plan, the second response plan, and the third response plan, and automatically execute the priority plan. The first response plan may include calculating a route to a location with cellular service using the waypoint data when Global Positioning System (GPS) signals are unavailable, returning the AV to the location with cellular service using the waypoint data and the waypoint annotations, and transmitting a distress alert to one or more emergency services at the location. The second response plan may include moving the AV toward the potential rescuer and transmitting a distress alert to the potential rescuer. The third response plan may include identifying a closest visible location, moving the AV to the closest visible location; and storing the waypoint data and the waypoint annotations on a removable memory.

Additional features and advantages are realized through the techniques disclosed herein. Other embodiments and aspects are described in detail herein. Refer to the description below and to the drawings for the various features and aspects disclosed herein.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to emergency response systems, and more specifically, to an autonomous device-based emergency response system for remote areas.

Some humans enjoy participating in activities in which there remains a chance of severe injury and/or becoming lost. Many of these activities are necessarily performed in locations where it may be impossible to transmit an emergency distress signal or otherwise facilitate rescue. Accordingly, some embodiments of this disclosure may include the use of a rescue autonomous vehicle (RAV) to assist in a rescue in the event that an emergency occurs. In some embodiments, if a person or group is stranded or incapacitated with no ability to call for help, they may instead activate the RAV.

In some embodiments, the RAV may be any vehicle that is capable of performing some functions with limited or no human intervention, such as drones, unpiloted vehicles, and remotely guided vehicles. The functions performed may occur in the air, on ground, on the water, under the water, in space, under-ground, or anywhere else the vehicle can navigate, including combinations thereof (e.g., an all-terrain autonomous vehicle). In some embodiments, some of the functions of the vehicle may be controlled by a remote human operator, while other functions may be carried out autonomously. Further, the vehicle may be configured to allow a remote operator to take over functions that can otherwise be controlled autonomously. Yet further, a given type of function may be controlled remotely at one level of abstraction and performed autonomously at another level of abstraction. For example, a remote operator could control high level navigation decisions for the vehicle (e.g., specifying that the vehicle should travel from one location to another), while the vehicle's navigation system autonomously controls more fine-grained navigation decisions (e.g., the specific route to take between the two locations, specific flight controls to achieve the route and avoid obstacles while navigating the route, etc.)

The RAV, in some embodiments, may further include an embedded emergency controller containing a plurality of dynamically updated response plans that, for example, may be triggered by periodic waypoint data and waypoint annotations from a plurality of other devices/sensors that the user also brought to the activity location. The RAV, in some embodiments, may be specially configured before the activity with the trigger criteria for starting the response plans, when to record waypoints, what data to record and/or annotate in the waypoints, as well as activity-specific strategies for facilitating the rescue, either autonomously or semi-autonomously. In some of these response plans, the RAV in some embodiments may attempt to use the recorded waypoint data and waypoint annotations to travel to a desirable location for transmitting to a known rescue service, a preselected emergency contact, and/or manually transmitting via "on-AV" presentation devices in response to opportunistic events.

Some embodiments may include a number of fail-safes for the RAV itself to utilize the recorded waypoint data and waypoint annotations to overcome basic issues that it may encounter, such as terrain or weather obstacles, as well as look for "opportunistic" chances to transmit the data directly to persons/rescuers it may encounter. The RAV, in some embodiments, may also attempt to be proactive in analyzing the waypoint data and/or waypoint annotations, and may attempt to interact with the user to notify/interrogate them when the RAV believes it should start a response plan. Additionally, the RAV may employ additional strategies if other conditions exist, such as low battery, poor weather conditions, etc. Some of these response plans may involve utilizing multiple capabilities of the RAV, such as an all-terrain capable RAV using its aerial capabilities during the data collection phases, but then switching to its ground or water capabilities due to inclement weather.

The rescue system in some embodiments may further include a number of environmental resources to create, maintain and execute response plans against several possible rescue strategies/scenarios. These environmental resources may include a Mission Station (MS), a configuration and tracking device (CTD) having a mission application (MA) thereon. In operation, the user may create a base profile for the rescue system using the CTD/MA before beginning the activity. This base profile may include a user profile containing information about the user (e.g., picture, name, age, telephone number, emergency contacts, medical conditions, etc.), and activity profile containing information about the activity the user will embark upon (e.g., type of activity, planned route, other gear the user will carry (e.g., smartphone, GPS device, video camera, etc.), start/stop dates, etc.) The CTD/MA may then enhance the base profile with current location data, such as topographic maps of the activity location, terrain overlays of the activity location, expected weather at the activity location, coordinates to known cellular towers and emergency responders near the activity location, capabilities of the other gear, and drivers/plugins to access the other gear.

The CTD/MA may monitor waypoint data and waypoint annotations collected during the activity to detect trigger events. This waypoint data and waypoint annotations may include factors such as 3D location data (when available), wide angle picture or video data periodically collected during the activity, wide angle picture or video data collected in response to triggered events, the presence of other people at sites along the activity route, biometric data about the user, time stamp data, local temperature/barometer data, etc. For example, if a user is stranded or incapacitated with no ability to directly call for help, the user may instead activate the RAV using the CTD/MA or MS. Additionally or alternatively, CTD/MA and/or MS may have the capacity to automatically determine that a serious event occurred (e.g., a sudden change in elevation or a long time period without additional activity) and automatically activate the RAV. In either case, the CTD/MA and/or MS may use the profile(s) and the collected waypoint data and waypoint annotations to select and prioritize response plans and transmit them to the RAV. The RAV may then launch and perform the response plans in priority order.

Emergency Rescue System

Figure 1:
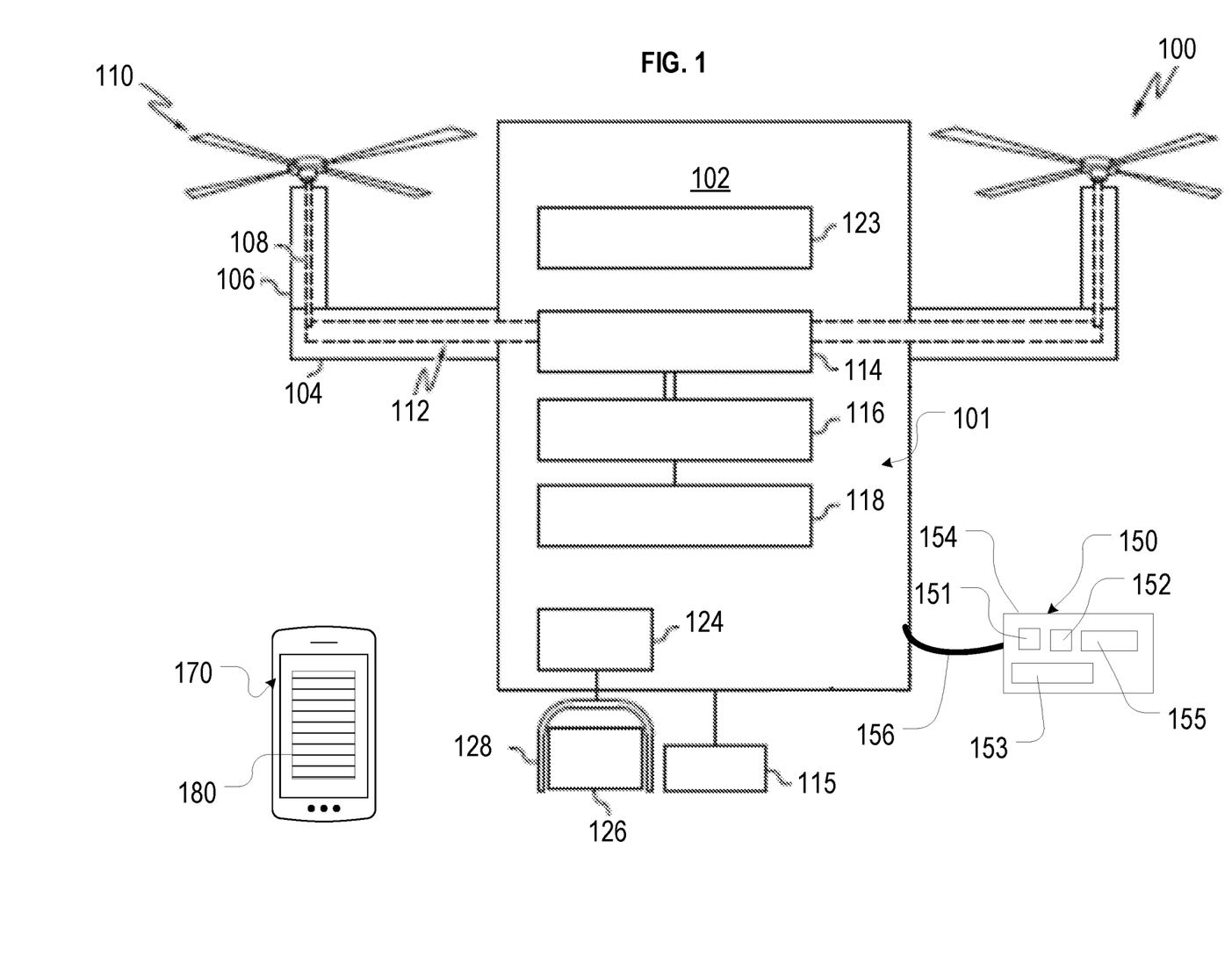
FIG. 1 illustrates an example emergency rescue system, consistent with some embodiments.
Figure 2:
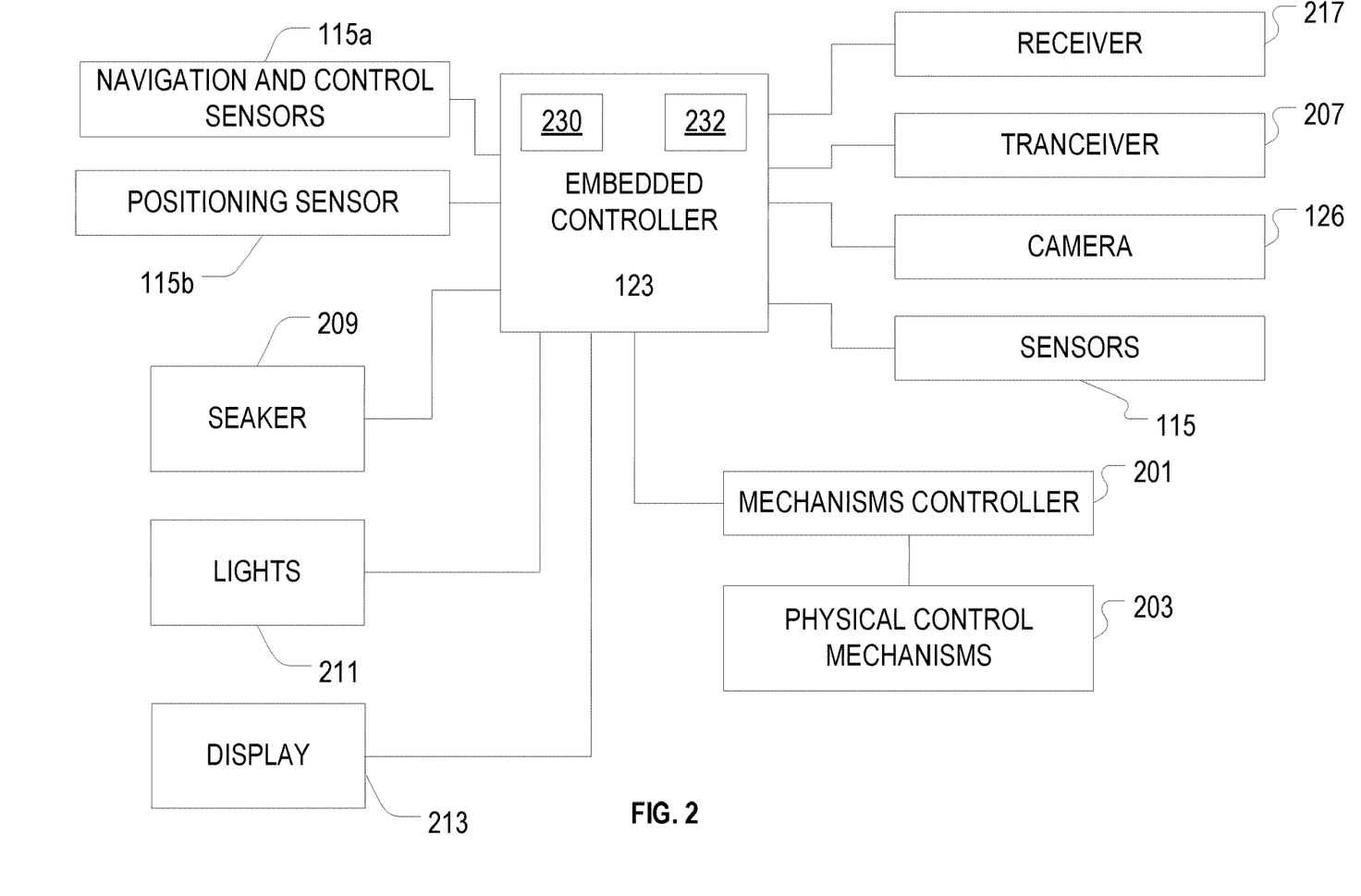
FIG. 2 illustrates example control hardware and other hardware components of a rescue autonomous vehicle (RAV), consistent with some embodiments.

FIGS. 1-2 illustrate an example emergency rescue system 100, consistent with some embodiments. As shown in FIG. 1, this system 100 may include a rescue autonomous vehicle (RAV) 101, a mission station (MS) 150, a configuration and tracking device (CTD) 170 having a mission application (MA) 180 thereon.

The RAV 101 depicted in FIG. 1 is optimized for aerial use. However, embodiments of the present disclosure may be used in and with other types of autonomous vehicles, including those designed to operate on ground, on the water, under the water, in space, under-ground, or combinations thereof (e.g., an all-terrain vehicle). In this embodiment, the RAV 101 may include a body 102 attached to supports 104, such as a stanchion 106. The stanchions 106, in turn, may provide a housing for a driveshaft 108 within each of the stanchions 106. These driveshafts 108 may be connected to propellers 110. A power transfer mechanism 112 (e.g., a chain, a primary driveshaft, etc.) may transfer power from a geared transmission 114 to the driveshafts within the stanchions (e.g., from geared transmission 114 to the driveshaft 108 inside stanchion 106), such that propeller 110 may be turned to provide lift and steering to the RAV 101. Geared transmission 114 may comprise a plurality of gears or a continuously-variable-transmission, such that a gear ratio inside geared transmission 114 may be changed. Power to the geared transmission 114 may be provided by a motor 116, such as an electric, internal combustion, or turbine engine. The motor 116, in turn, may be connected to a battery, fuel tank 118, or other power source appropriate for the type of motor 116 and the expected duration of the flight.

Affixed inside the bottom of body 102 may be a camera controller 124, which includes logic that controls movement of a camera 126 via a camera support 128 (which includes actuators, not shown, for movement of camera 126). The camera controller 124 may be able to focus, as well as aim, camera 126, while under the control of an embedded controller 123. The camera 126, in turn, may be capable of sending still or moving visible light digital photographic images (and/or infrared light digital photographic images) to the embedded controller 123. These images may be used to determine or help determine the location of the RAV 101 (e.g., by matching to known landmarks), to sense other platforms/obstacles, and/or to determine speed (by tracking changes to images passing by), as well as to receive visual images of the objects of the inspection for analysis. Also affixed inside the bottom of body 102 may be one or more other sensors 115 (only one shown in FIG. 1 for clarity), such as a hydrometer, thermometer, particulate sensors, multi-spectral cameras, microphones, barometers, chemical sensors, vibration sensors, photometers, accelerometers, etc. These sensors 115 may also be used to analyze the user and the user's location, as well as to ascertain the environment in which the RAV 101 is operating. For example, an underwater-type RAV 101 may include a water pressure gauge, a current strength meter, oxygen level meter, etc. whereas an aerial type RAV 101 may include sensors for altimeter, attitude, wind gauge, moisture/rain detection, smoke detection, etc., and an all-terrain type RAV 101 may include both sets of sensors Moreover, while these components are described as being located on or inside the bottom of body 102, in other embodiments, alternative locations may be used.

Also on RAV 101, in one or more embodiments, may be a speaker 209, lights 211, and display 213 (See FIG. 2). Speaker 209, lights 211, and display 213 may be used by the embedded controller 123 to provide aural and visual warnings, alerts, etc. That is, once the RAV 101 detects a potential rescuer in these embodiments, an aural alert (e.g., an intense warning sound broadcast by speaker 209 on the RAV 101) may be sounded, and lights 211 may be flashed, warning persons of the proximity of the RAV 101.

While the RAV 101 is depicted in FIG. 1 as having multiple propellers, in another embodiment a single propeller elevates and adjusts pitch and roll of the AV while a rotor adjusts yaw of the RAV 101 using a set of positioning sensors (e.g., gyroscopes) that cause the propeller and rotor to change attitude. Similar positioning sensors may likewise adjust the attitude of multiple propellers. Some embodiments may also include outer framework or skin surrounding one or more lifting gas bags (not shown) for increased efficiency. Ground based RAVs 101 may include wheels and/or tracks (not shown) for locomotion. Water based RAVs 101 may include ballast tanks and/or propellers for locomotion.

The MS 150 in some embodiments may provide a user interface for the RAV 101 (e.g., speakers 151 and microphone 152), as well as provide backup power supply 153, solar recharging cells 154, additional storage capacity 155, and a power/communication cable 156 for the RAV 101. The configuration and tracking device (CTD) 170 in some embodiments may comprise a smart phone having the mission application (MA) 180 loaded thereon. The MS 150, the CTD 170 and the RAV 101 may be adapted for communication over an appropriate wireless protocol (e.g., 802.11x or cellular), as well as by an backup communication protocol for use when wireless service is unavailable. Suitable backup communication systems protocols include, without limitation, General Packet Radio Service ("GPRS"), FRS (Family Radio Service), Bluetooth, and infra-red based receivers/transmitters, as well as physical wired connectors (e.g., serial connectors, Universal Serial Bus connectors, etc.)

FIG. 2 depicts the control hardware and other hardware components of the example RAV 101 in FIG. 1, consistent with some embodiments. The on-board, embedded controller 123, in this embodiment, controls a mechanisms controller 201, which may be a separate computing device that controls a set of platform physical control mechanisms 203, such as throttles for electric motor 116, selectors for selecting gear ratios within the geared transmission 114, controls for adjusting the pitch, roll, and angle of attack of propellers such as propeller 110 and other controls used to control the operation and movement of the RAV 101 depicted in FIG. 1. The embedded controller 123 may be coupled to both an on-board memory 230 and a removable memory 232 (e.g., a nonvolatile memory card) via communication busses (not shown). The removable memory 232, in some embodiments, may contain the waypoint data and waypoint annotations. In other embodiments, on-board memory 230 may contain a copy of all of the data, and the removable memory 232 may mirror some or all of that information.

Whether in autonomous mode or remotely-piloted mode (based on control signals sent from the MS 150 to the embedded controller 123 shown in FIG. 2), the embedded controller 123 may control the operation of RAV 101. This control may include the use of outputs from navigation and control sensors 115*a* to control the RAV 101. Navigation and control sensors 115*a* include hardware sensors that may: (1) determine the location of the RAV 101; (2) sense other AVs and/or obstacles and/or physical structures around RAV 101; (3) measure the speed and direction of the RAV 101; (4) detect any people, vehicles, and/or buildings nearby the RAV 101; (5) detect the current strength of any radio signals, including cellular transmission signals; and (6) provide any other inputs needed to safely control the movement of the RAV 101.

With respect to the feature of (1), determining the location of the RAV 101, this may be achieved in one or more embodiments through the use of a positioning system 115*b*, which may be a separate device or may be part of the embedded controller 123. Positioning system 115*b* may use the global positioning system (GPS) network, which uses space-based satellites that provide positioning signals that are triangulated by a GPS receiver to determine a 3-D geophysical position of the RAV 101. Positioning system 115*b* may also include and use, either alone or in conjunction with a GPS system, land-based radio beacons for radio navigation, physical movement sensors such as accelerometers (which measure changes in direction and/or speed by an AV in any direction in any of three dimensions), speedometers (which measure the instantaneous speed of an AV), air-flow meters (which measure the flow of air around an AV), barometers (which measure altitude changes by the AV), camera 126 (to match landmarks), etc. Such physical movement sensors may incorporate the use of semiconductor strain gauges, electromechanical gauges that take readings from drivetrain rotations, barometric sensors, etc.

With respect to the feature of (2), sensing other AVs and/or obstacles and/or people and/or physical structures around RAV 101, the embedded controller 123 may utilize radar or other electromagnetic energy that is emitted from an electromagnetic radiation transmitter 207, bounced off a physical structure (e.g., a building, bridge, another AV, etc.), and then received by an electromagnetic radiation receiver 217. By measuring the time it takes to receive back the emitted electromagnetic radiation, and/or evaluate a Doppler shift (i.e., a change in frequency to the electromagnetic radiation that is caused by the relative movement of the RAV 101 to objects being interrogated by the electromagnetic radiation) in the received electromagnetic radiation from when it was transmitted, the presence and location of other physical objects may be ascertained by the embedded controller 123. Other embodiments may utilize video signals and interpret those signals using a trained neural network or the like.

With respect to the feature of (3), measuring the speed and direction of the RAV 101, this may be accomplished in one or more embodiments by taking readings from an on-board airspeed which may be one of navigation and control sensors 115a on the RAV 101 and/or detecting movements to the control mechanisms on the RAV 101 and/or the navigation sensors 115a discussed above.

Feature (4) may be accomplished in some embodiments by using a charge-coupled device (CCD) or other image detection hardware, coupled with image recognition software trained to detect people and vehicles. In some embodiments, a CCD capable of thermal imaging may be particularly desirable. Feature (5) may be accomplished in some embodiments using a radio frequency detector coupled to a voltage meter.

With respect to the feature of (6), providing any other inputs needed to safely control the movement of the RAV 101, such inputs include, but are not limited to, control signals to fly the RAV 101, to land AV 101 (e.g., to make an emergency landing), etc.

Data Processing System

Figure 3:
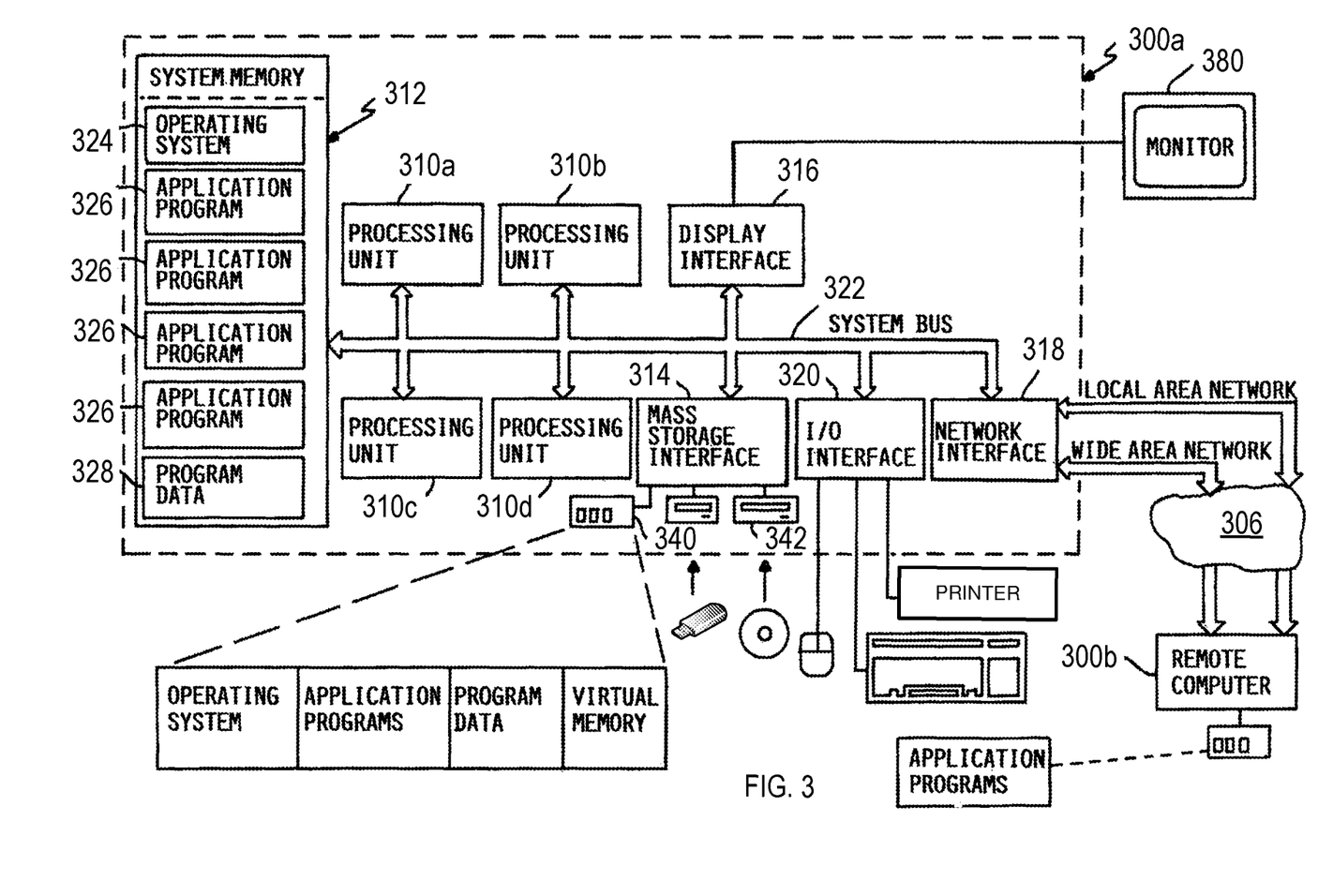
FIG. 3 is a block diagram of a data processing system (DPS), consistent with some embodiments.

FIG. 3 illustrates an embodiment of a data processing system (DPS) 300 suitable for use as the embedded controller 123, the MS 150, and/or CTD 170. In some embodiments, the DPS 300 is implemented as a personal computer; portable computer, such as a laptop or notebook computer, PDA (Personal Digital Assistant), tablet computer, or smart phone; processors embedded into a larger devices, such as a snowmobile, airplane, or boat; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310a-310d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340 or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 342, which are in communication with the processors 310 through the system bus 322. The program code in the different embodiments may be embodied on different physical or tangible computer readable media, such as the system memory 312 or the mass storage devices 340, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interface units 314, 316, 318, 320 support communication with a variety of storage and I/O devices. The mass storage interface 314 supports the attachment of one or more mass storage devices 340, 342, which are typically rotating magnetic disk drive storage devices, a solid-state storage device (SSD) that uses integrated circuit assemblies as memory to store data persistently, typically using flash memory, or a combination of the two. However, the mass storage devices 340, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and users to communicate with the DPS 300. Note, however, that while the display interface 316 is provided to support communication with one or more display units 380, the computer systems 300 does not necessarily require a display unit 380 because all needed interaction with users and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using an appropriate wireless protocol (e.g., 802.11x, cellular, etc.). Embodiments may also include additional local communication protocols for use when wireless services are unavailable. Suitable local communication systems protocols include, without limitation, General Packet Radio Service ("GPRS"), FRS (Family Radio Service), Bluetooth, and infra-red based receivers/transmitters, as well as physical wired connectors (e.g., serial connectors, Universal Serial Bus connectors, etc.) Those skilled in the art will appreciate that many different network and transport protocols may be used to implement the communications medium 306. The Transmission Control Protocol/Internet Protocol ("TCP/IP") suite contains suitable network and transport protocols.

Pre-Activity Configuration

Figure 4:
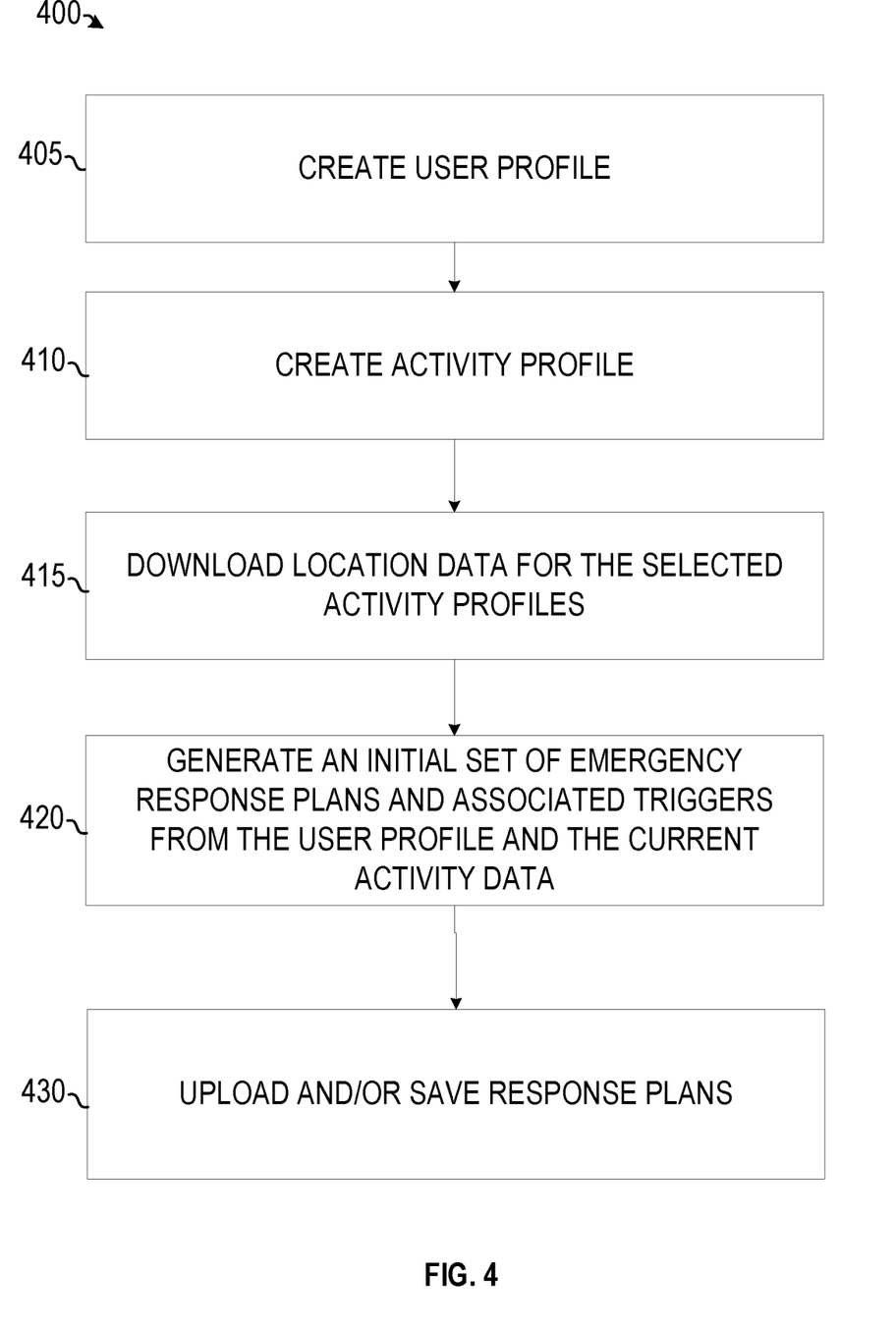
FIG. 4 depicts a method of configuring an embedded controller for a RAV, consistent with some embodiments.

FIG. 4 depicts a method 400 of configuring the embedded controller for the RAV 101, consistent with some embodiments. At operation 405, the user of the system may create a user profile in the MA 180. This user profile may include information about the user, such as their: picture, name, age, address, telephone number, emergency contact telephone numbers, primary care physician, known medical conditions, current medication list and dosages, etc. The user profile may also include communication and pairing information about any other electronic equipment to which the system 100 may interface during an activity, such as identifiers and passwords for smart watches, smart phones, heart rage monitors, action cameras, avalanche transceivers, dive computers, GPS receivers, and the like. In some embodiments, the user profile may also include information about the user's fitness and relevant skills, such as estimated physical fitness, training certifications, and the like. At operation 410, the user of the system may create an activity profile for an upcoming trip in the MA 180. This activity profile may include the type of activity the user will embark upon (e.g., mountain hiking vs. snowmobiling), the route over which the activity is planned to occur, the planned start and stop days and times, and the specific gear items the user plans to bring on this specific trip. These gear items may include both electronic equipment and conventional outdoor gear items (e.g., knives, rope, shovels, flashlights, etc.)

At operation 415, the MA 180 may then download location data for the selected activity profile(s), such as topographical maps for the activity location, terrain overlays for the activity location, expected weather at the activity location(s), coordinates to known cellular towers and emergency responders near the activity location(s), capabilities of the other gear items that will be brought, and drivers/plugins required to access those other gear items. In some embodiments, this operation may utilize public data sources, such as Geographic Information System data. This operation may also include obtaining predictions from other high resolution numerical weather prediction (NWP) models, also available on the Internet, and/or data from ground radar systems, sky view cameras, temperature/humidity stations, and the like.

At operation 420, the MA 180 may generate a mission profile comprising a data collection plan, plus an initial set of emergency response plans and associated triggers, from the user profile and the current activity data, and then upload those one or more of those initial response plans to the RAV 101. Depending on the activity type, terrain, location, and length, a response plan may include calculating one or more schedules of automatic waypoint collection and determining which annotations to collect (e.g. take video, images, audio messages, GPS, terrain overlays, etc.) at which intervals. A response plan may include selecting messages and/or recipients for messages to be transmitted by the RAV 101 after activation.

A response plan may also include one or more associated triggers. For example, a baseline waypoint collection frequency may be triggered manually and/or by detecting the user has arrived at the activity location. A higher waypoint collection frequency may be triggered by another manual trigger and/or automatically in response to detecting that ability of the RAV 101, the CTD 170, or MS 180 to transmit (via cellular transmission or other) has become compromised, such as moving out of range or behind deep cover. In some embodiments, the automatic triggers may further include configurable time based and/or distance based thresholds, such as "out of signal" for at least two minutes or 0.5 km. Some triggers may be internal to the system 100, such as a low battery condition in one device, in which that device notices that its battery is low and decides to reduce annotation data to just that most essential for rescue, or a low storage condition, in which the system 100 identifies and deletes redundant data from pre-existing waypoints.

Some response plans may include interactive alerts. For example, a response plan may include an audible range warning to alert user when the RAV 101 can no longer reach a preferred rescue location, triggered by the user approaching such a threshold. Other interactive alerts may include providing audible notice of changing weather conditions, unexpectedly high heartrates, unexpected loss of communication with other gear items, etc.

Some response plans may be trigged manually, such as if a user realizes they are lost. In these response plans, the RAV 101 may perform a number of actions, such as: gain altitude, take a photograph of the area, and transmit it to the MA 180; or fly to the closest location with cellular service and transmit a pre-selected message to the pre-selected recipients. In some embodiments, multiple response plans can be performed simultaneously and/or "chained" together in response to multiple triggers. For example, the RAV 101 may first gain altitude, take a photograph of the area, and transmit the photograph, then begin flying to the closest location with cellular service and transmit a pre-selected message to the pre-selected recipients; then detect a closer potential rescuer while in route, drop altitude and transmit another pre-selected message to that potential rescuer. In these embodiments, the RAV 101 may include the ability to prioritize the active response plans and select the one with the highest priority.

At operation 430, the response plan(s) and profile(s) may be uploaded to the rescue system for use during the activity. The response plan(s) and profile(s) may also be saved for later use, in whole or in part. The response plan(s) and profile(s) may also be shared with others as documentation of the planned activity, or even distributed after the activity as a resource to help others.

Example Response Plan

Figure 5A:
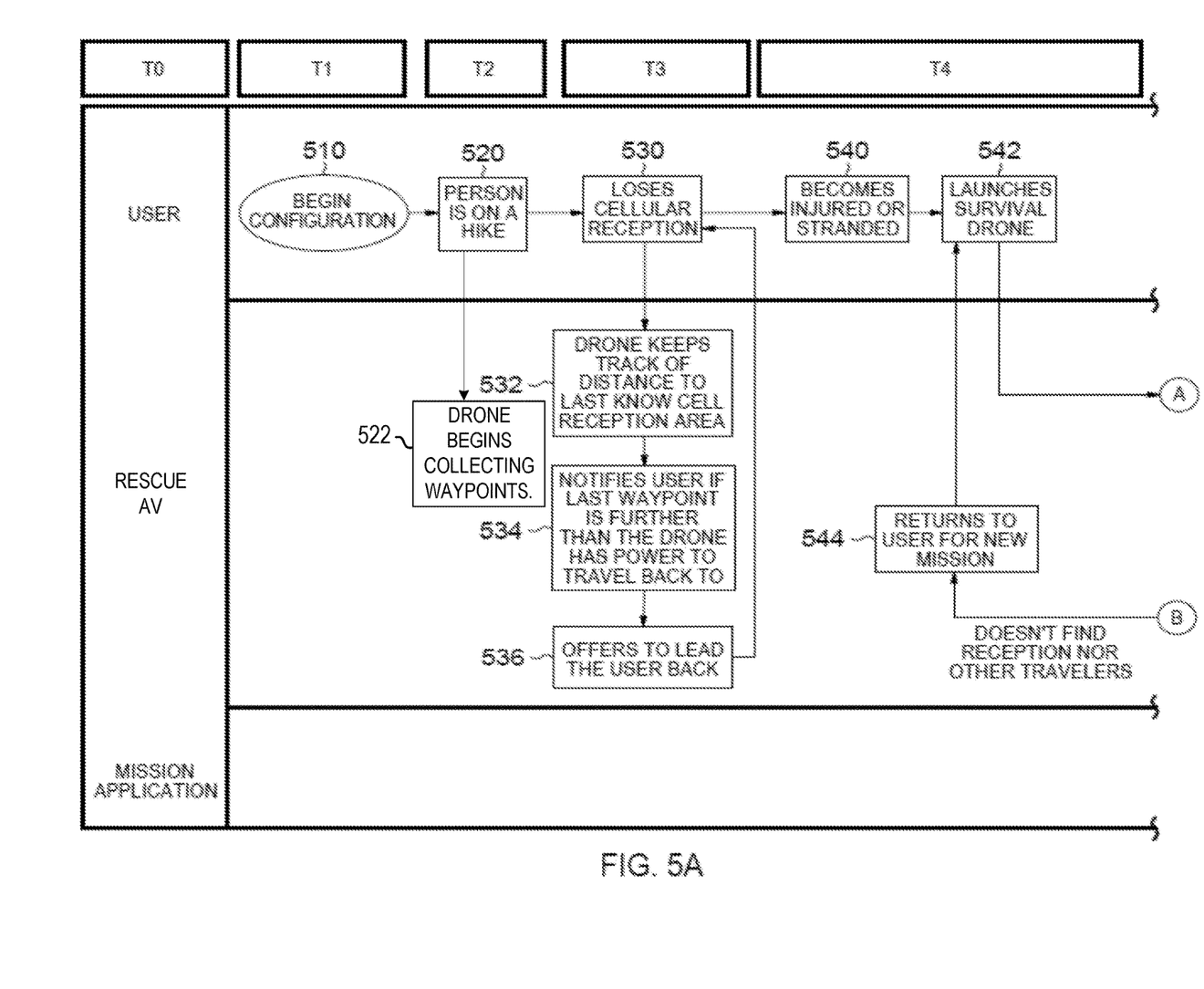
FIGS. 5A and 5B (collectively FIG. 5) illustrate an example RAV in operation, consistent with some embodiments.
Figure 5B:
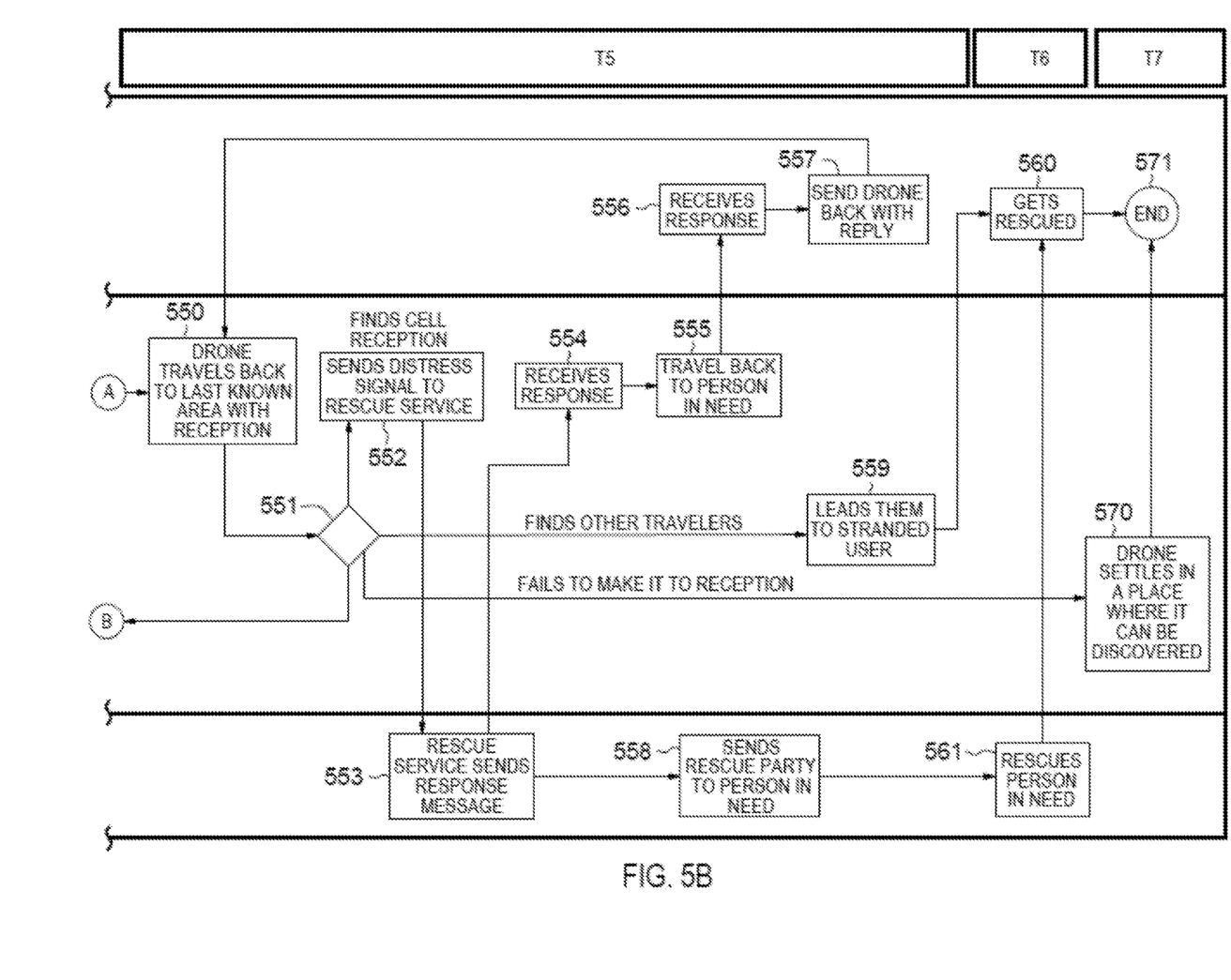

FIGS. 5A and 5B (collectively FIG. 5) illustrate an example rescue system 100 in operation, consistent with some embodiments, in which T1-T7 represent various sets of related triggers. At operation 510, the user may configure the rescue system 100 using the method described in more detail with reference to FIG. 4. At operation 520, the user arrives at the activity location. At the start of the activity, the MA 180 may first connect to the other devices that the user brought to the location and that the MA 180 can use to collect start data and/or waypoint data, plus associated annotations.

The start data may comprise a specially tagged initial waypoint. The waypoint data, in turn, may include current location data; time stamp data; wide angle or 360 degree picture(s) of the location, and video data of a location. The waypoint annotations in some embodiments may include the presence of other people, vehicles, or buildings at the location; biometric data about the user from the other devices (e.g., wearables), and local weather data at that waypoint. The waypoint annotations may further include manually created information to be used for subsequent planning operations, such as personal names, descriptions, comments, and reminders about various points of interest (e.g., "this was a great campsite" or "next time, take the left path instead of the right path here.")

In some embodiments, the RAV 101 may begin operation at 522 and enter a "follow me" mode. The MA 180 and RAV 101 may also enter a "ready" condition at operation 522. In this ready condition, the RAV 101 may save waypoints to use as "breadcrumbs" in the event that the system may be unable to access location services, such as the Global Positioning System (GPS), and/or access cellular or other radio-frequency services. The MA 180 and RAV 101 may periodically collect the waypoint data and waypoint annotations using the capabilities of the CTD 170 itself, as well as any paired other gear items. The MA 180 may analyze the collected waypoint data and waypoint annotations for one or more of the trigger conditions. In effect, the system 100 in these embodiments is now in a monitoring state, waiting for the conditions that trigger an enhanced response, such as an "out of signal" event (operation 530) that would trigger higher frequency and fidelity of waypoint recording and associated annotations (e.g., start monitoring for terrain). Some embodiments may also include trigger events that may cause the system 100 to re-enter this ready condition, such as if the RAV 101 detects that a "good" transmission location was reached, if cellular service is reestablished, if the user has returned to their starting location, etc.

At operation 532, in response to an out-of-signal operation 530, the rescue system 100 may select one or more of its response plans, such as to begin recording waypoint data and waypoint annotations at a higher frequency (and/or at key points along the traversal path) and fidelity (i.e., enhanced breadcrumb collection). In this way, the system 100 may collect a series of breadcrumbs (i.e., waypoint/location data points) that the RAV 100 can use to travel back to the last known cellular reception area. The rescue system 100 may upload some or all of this waypoint data and waypoint annotations to the RAV 101, to be used in the event that the MA 180 fails.

At operations 534-536, in response to a subsequent low-battery alert, the rescue system 100 may select another appropriate response plan, such as notifying the user that the RAV 101 may have insufficient power to travel back to the last known cellular transmission site and offering to lead the user back using a combination of the RAV 101 and the MA 180. In some embodiments, this may include prioritizing the response 532, 534, and 536 and then executing the responses in order of priority (e.g., leading the user back to a cellular reception area 536 may take priority over taking additional waypoints 532).

At operation 540, if user becomes injured or stranded during the activity, another response plan or set of response plans may be triggered. For example, in one potential response plan, the RAV 101 may launch (if necessary), then attempt to communicate with the user for further assessment of user's status at operation 542. For example, the RAV 101 may broadcast audio or send a SMS message asking the user "Are you OK" or "Do you need to be rescued? Say 'cancel' within 30 seconds." Failure to respond to this communication (failsafe) may automatically trigger additional response plans, such as the system 100 asking the user if they allow the RAV 101 to follow waypoints back to last known location with good cellular signal at operation 550 and then transmitting calls for assistance to a list of known potential rescuers at operation 552. Additionally or alternatively, the RAV 101 may ask the user if they are able to follow it back to last known location with a good cellular signal.

After completing one or more of the triggered response plans, the RAV 101, in some embodiments, may wait for an answer from the potential rescuers at operations 553-554, then travel back to the user at operation 555, and relays the response from the potential rescuers at operation 556. This loop 550-557 may then be repeated, allowing for the injured user and the rescuers to coordinate.

Additionally or alternatively, some embodiments may support opportunistic rerouting, shown at blocks 551, 553, 558-561. For example, if the RAV 101 encounters other people (i.e., potential rescuers) enroute to a communication location, the RAV 101 may approach and playback waypoint data and/or waypoint annotations to those potential rescuers (e.g., via its speaker 209, lights 211, and/or display 213), and then offer lead the opportunistic rescuers to the injured user at operations 559-560 if sufficient battery exists. The RAV 101 may also allow for removal of its removable memory 232 for playback on or transmission from other devices (with other signal options). Some embodiments may further support initiating a discovery protocol for electronic devices in the vicinity and then querying for new options for transmission, such as a device-device peer protocol. Again, this may include prioritizing the response plans and then executing the responses in order of priority (e.g., the system 100 may prioritize opportunistic rescuers if the injured user is bleeding severely, whereas the system 100 may prioritize cellular transmission if the injured user will need an airlift). If an opportunistic re-routing is successful, the RAV 101 may continue with its existing list of response plans (e.g., continue to the closest cellular location and transmit), or may return to the injured user for additional instructions.

As each of the various response plans are triggered, the MA 180 may finalize waypoint data and/or waypoint annotations, and then transmit the finalized data to the RAV 101. The user may also be asked to add other data (i.e., prior to the RAV 101 moving away) in some embodiments, such as for additional content to append to one or more of the programmed messages. As the various triggers occur, the MA 180 may determine the highest priority response plans and/or determine an optimal order to perform those plans. For example, a default order may be for the RAV 101 to travel to all waypoints in reverse order of recording, then transmit one or more messages when it reaches the last known cell reception point. However, in some circumstances, it may be more optimal for the RAV 101 to skip certain waypoints and go directly to one where there was a shelter/building. The rescue system 100 may also dynamically update the set of emergency response plans and associated triggers in response to the collected waypoints and annotations, and then upload the updated emergency response plans to the RAV 101. For example, if one of the waypoints included an annotation that another group was camped at the location, then one or more of the response plans may now include flying to that group for assistance.

If the RAV 101 is able to successfully complete a response plan e.g., the RAV 101 has confirmed its messages have been successfully transmitted to a rescue service or authority, then the RAV 101 may chose at operations 557, 550, 551, 544 to return to the user in some embodiments. In other embodiments, the RAV 101 may continue to the response plan having the next highest priority, thereby providing multiple potential rescue scenarios.

If the RAV 101 is unable to successfully complete a response plan (e.g., it does not find an area with reception nor any travelers), the RAV 101 may chose at operations 551, 544 to return to the user for a new set of instructions. In some embodiments, if the RAV 101 detects a low battery event before it is able to successfully complete a response plan, then another response plan may be triggered at operation 570, in which the RAV 101 looks for a nearby location with high visibility and/or high potential for traffic, enter a low power mode, and then "park" itself until a potential rescuer approaches. In some embodiments, a response plan may also include preferentially "parking" itself in a visible and sun lit location, and then recharge itself using solar panels or the like. In these embodiments, once the battery is sufficiently recharged, RAV 101 may resume its previous response plan(s). In some embodiments, the RAV 101 may include a capability to detect audio/motion and/or radio signals (e.g., avalanche transceiver) to "wake up" and attempt to transmit and/or attract attention to itself (e.g., transmit rescue mission data if an electronic device connects; emit auditory cues, smoke, etc. if potential rescuers are detected during the day; launch flares, emits lights, etc. if potential rescuers are detected during the night; etc.) Some embodiments may also freeze its display with a mission map and/or assure removable memory 232 has the latest mission data.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

GENERAL

Aspects of the present invention were described herein with reference to flowchart illustrations and/or block diagrams of methods, apparatus (systems), and computer program products according to embodiments of the invention. It will be understood that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:
1. A controller for an emergency response system, comprising: a processor coupled to a memory, the memory containing program instructions that, when executed on the processor, cause the controller to:
   receive an activity profile, wherein the activity profile comprises a type of activity and a planned route;
   generate a first response plan for an autonomous vehicle (AV) for a first trigger event based at least in part on the activity profile;
   collect waypoint data and waypoint annotations associated with the waypoint data during a user's activity;
   detect a first trigger event indicating that the user needs assistance;
   dynamically update the first response plan for the AV for the first trigger event based on the collected waypoint data and waypoint annotations;
   detect a second trigger event, wherein the detection of the second trigger event comprises detecting a person nearby the AV;

determine a second response plan for the AV based on the collected waypoint data and the waypoint annotations, wherein the determination of the second response plan comprises transmitting a distress alert to the detected person;
select a priority plan from among the first response plan and the second response plan; and
execute the priority plan.

2. The controller of claim 1, wherein at least some of the waypoint annotations are collected by a plurality of devices available to the user during the activity.

3. The controller of claim 2, wherein at least some of the waypoint annotations are collected by a plurality of sensors connected to the AV.

4. The controller of claim 2, further comprising program instructions that, when executed on the processor, cause the controller to pair with the plurality of devices.

5. The controller of claim 2, wherein the first trigger event is automatically detected through monitoring of the waypoint data and the waypoint annotations.

6. The controller of claim 1, wherein the first response plan comprises:
navigating the AV to a location previously determined to have cellular service; and
transmitting a distress alert to one or more emergency services.

7. The controller of claim 6, wherein navigating the AV to the location previously determined to have cellular service comprises following the waypoints back to the location.

8. The controller of claim 7, wherein navigating the AV to the location previously determined to have cellular service comprises skipping one or more of the waypoints.

9. The controller of claim 6, further comprising program instructions that, when executed on the processor, cause the controller to calculate a route to the location with previously determined to have cellular service using the waypoint data when Global Positioning System (GPS) signals are unavailable.

10. The controller of claim 1, wherein the AV is adapted to automatically follow the user during the user's activity.

11. The controller of claim 1, wherein the determination of the second trigger event comprises detecting a low battery alert; and wherein determining the second response plan comprises:
identifying a closest visible location; and
stopping the AV at the closest visible location.

12. The controller of claim 11, further comprising program instructions that, when executed on the processor, cause the controller to store the waypoint data on a removable memory.

13. The controller of claim 1, further comprising program instructions that, when executed on the processor, cause the controller to:
receive a user profile;
automatically customize the first response plan based at least in part on the user profile.

14. The controller of claim 1, further comprising program instructions that, when executed on the processor, cause the controller to:
receive location data for an activity location, the location data comprising topographical maps for the activity location, terrain overlays for the activity location, expected weather at the activity location, and coordinates to cellular towers and emergency responders near the activity location; and
automatically customize the first response plan based at least in part on the location data.

15. A computer program product for an emergency response system, the computer program product comprising:
one or more computer readable storage media, and
program instructions collectively stored on the one or more computer readable storage media, the program instructions comprising:
program instructions for collecting waypoint data and waypoint annotations associated with the waypoint data during a user's activity;
program instructions for detecting a first trigger event indicating that the user needs assistance;
program instructions for determining a first response plan for an autonomous vehicle (AV) for the first trigger event based on the collected waypoint data;
program instructions for detecting a second trigger event, wherein the second trigger event comprises detecting a person nearby the AV;
program instructions for determining a second response plan for the AV based on the collected waypoint data and the waypoint annotations, wherein the second response plan comprises transmitting a distress alert to the detected person;
program instructions for selecting a priority plan from among the first response plan and the second response plan; and
program instructions for executing the priority plan.

16. A method for facilitating rescue, comprising:
receiving a user profile of a user;
receiving an activity profile from the user, the activity profile including an activity location for an activity;
receiving location data for the activity location;
automatically customizing a plurality of response plans for an autonomous vehicle (AV) based at least in part on the user profile, the activity profile, and the location profile;
configuring the AV to:
automatically follow the user during the activity;
automatically collect waypoint data and waypoint annotations during the activity, wherein the waypoint annotations are collected by a plurality of devices available to the user during the activity;
automatically update at least one of the plurality of response plans based on the collected waypoint data and the waypoint annotations;
automatically detect a first trigger event during the activity, the first trigger event indicating that the user needs assistance;
automatically select a first response plan from the plurality of response plans in response to the first trigger event based on the collected waypoint data and the waypoint annotations, wherein the first response plan includes:
calculating a route to a location with cellular service using the waypoint data when Global Positioning System (GPS) signals are unavailable;
navigating the AV to the location with cellular service using the waypoint data and the waypoint annotations; and
transmitting a distress alert to one or more emergency services at the location;
automatically detect a second trigger during the activity, wherein the second trigger comprises detecting a potential rescuer nearby the AV;
automatically select a second response plan from the plurality of response plans in response to the second trigger based on the collected waypoint data and the waypoint annotations, wherein the second response plan includes:
  moving the AV toward the potential rescuer; and
  transmitting a distress alert to the potential rescuer;
automatically detect a third trigger during the activity, wherein the third trigger comprises a low battery alert;
automatically select a third response plan from the plurality of response plans in response to the third trigger based on the collected waypoint data and the waypoint annotations, wherein the third response plan includes:
  identifying a closest visible location;
  moving the AV to the closest visible location; and
  storing the waypoint data and the waypoint annotations on a removable memory;
automatically select a priority plan from among the first response plan, the second response plan, and the third response plan; and
automatically execute the priority plan.

\* \* \* \* \*